H. R. HENDERSON.
MARINE VESSEL.
APPLICATION FILED AUG. 11, 1909.
1,000,678. Patented Aug. 15, 1911.
Fig. I.
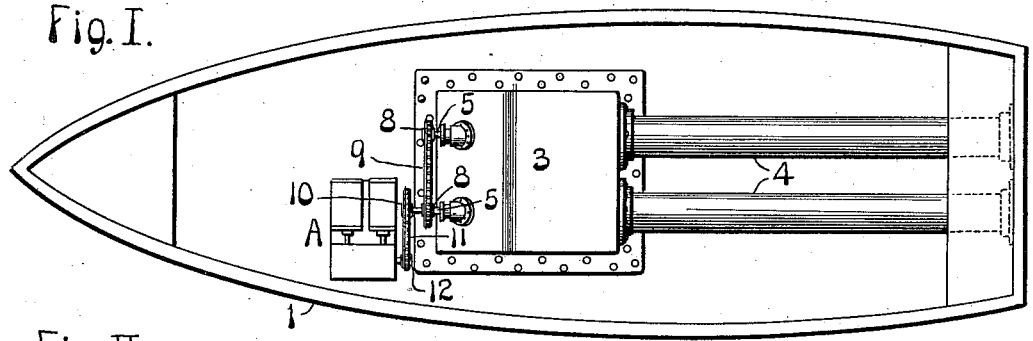
Fig. II.
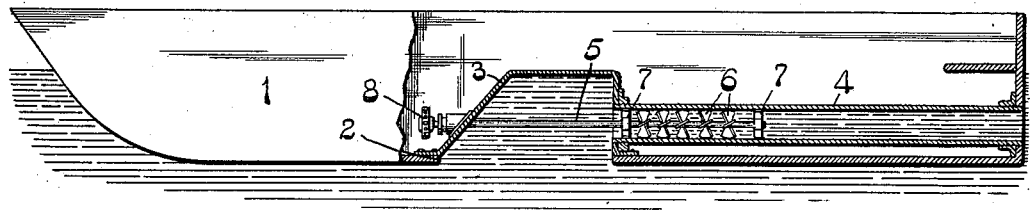
Fig. III.
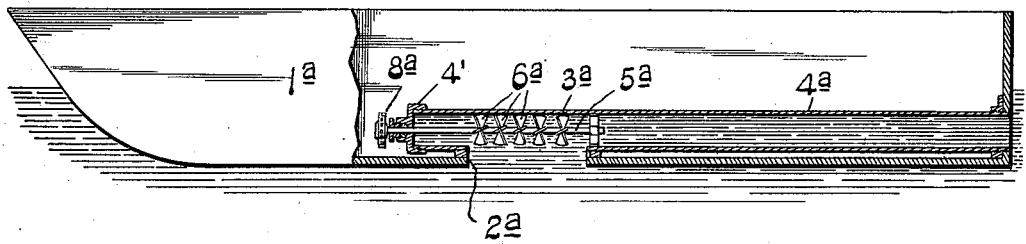
Fig. IV.
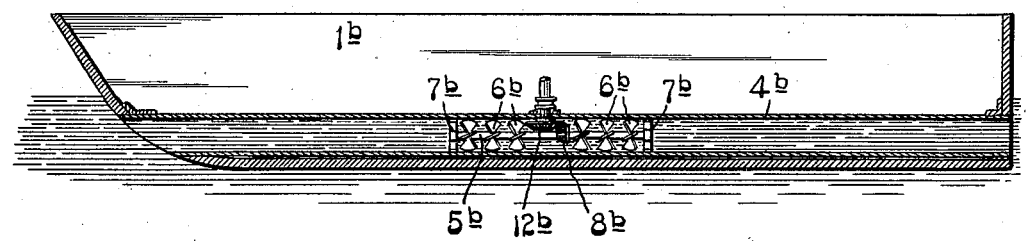
Witnesses
A. J. McCauley
M. C. Hammon
Inventor:
H. R. Henderson
by E. S. Knight
Atty.

UNITED STATES PATENT OFFICE.

HENRI R. HENDERSON, OF ST. LOUIS, MISSOURI.

MARINE VESSEL.

1,000,678. Specification of Letters Patent. Patented Aug. 15, 1911.

Application filed August 11, 1909. Serial No. 512,327.

*To all whom it may concern:*

Be it known that I, HENRI R. HENDERSON, a citizen of the United States of America, residing in the city of St. Louis and State of Missouri, have invented certain new and useful Improvements in Marine Vessels, of which the following is a full, clear, and exact description, reference being had to the accompanying drawings, forming part of this specification.

This invention relates to marine vessels and has for its primary object to provide an improved construction, combination and arrangement of parts in that type of marine vessels in which the hull of the vessel is provided with a conduit or conduits extending therethrough for water, the propeller being housed within the hull to maintain the water within which it is immersed in a comparatively unturbulent condition.

A further object of this invention is to provide improved means for utilizing the movement of the water through said conduit to intensify the action of the propelling power.

Figure I is a top or plan view of the hull of a marine vessel containing my improvement. Fig. II is in part a side elevation and in part a longitudinal section of the vessel shown in Fig. I. Fig. III is in part a side elevation, and in part a longitudinal section of a modification. Fig. IV is a longitudinal section of another modification.

In the accompanying drawings, and referring, first, to Figs. I and II: 1 designates the hull of my marine vessel, this hull being provided intermediate of its ends with a bottom opening at 2, above which, and within the hull, is an open pocket 3 in communication with the bottom opening 2, thereby providing for the presence of a body of water within said pocket. 4 designates conduits extending longitudinally of the hull 1, these conduits being arranged at their forward ends in communication with the pocket 3, and being open at the stern of the hull, in order that water entering into the conduits from said pocket may be discharged against the body of water exterior of the hull and at its stern. 5 designates propeller shafts extending longitudinally of the hull through the pocket 3, and into the conduits 4. These propeller shafts are provided with blades 6, (see Fig. II) and the shafts are journaled in skeleton bearing members 7, which, while they serve to support the propeller shaft, permit the flow of water through the conduits 4 during the operation of the propeller. Each propeller shaft extends through a stuffing box mounted upon the pocket 3, and has fixed to it a driving wheel 8 on which a driving chain 9 operates. One of the propeller shafts is provided with a driving wheel 10 that receives a driving chain 11, also operable upon a wheel 12 carried by the shaft of the engine A, (see Fig. I).

In the use of my marine vessel, there is constantly present within the pocket 3 and the conduits 4, water that flows thereinto from the body of water in which the vessel floats, and the water in said pocket and conduits is only slightly subjected to the turbulence in the body of water surrounding the vessel. When the propellers are in operation, their blades turn freely in the conduits and in impingement against the water therein which is confined to such a degree as to prevent its spreading away from the blades, and as a consequence, much more effective propelling action is obtained than would be possible if the propellers were located exterior of the vessel hull, so that the water around them might be thrown aside, as is the case in the use of screw propellers mounted in the ordinary manner. Furthermore, by housing the propeller blades within the conduits, and extending these conduits to the stern of the vessel hull, I provide for the water being forced rearwardly through the conduits and against the body of water at the stern of the hull, with the result of aiding the propulsion of the vessel due to the rearward discharge of the water through the conduits.

While I have shown two conduits 4 and two propellers operable therein, it is obvious that any other number of conduits and propellers might be used without departing from my invention.

In Fig. III, I have shown a modification in which 1$^a$ designates the hull of the vessel, and 2$^a$, the opening at the bottom of the hull. The conduit 4$^a$ is in this modification, continued across the opening 2$^a$ instead of terminating at the rear end of said opening to provide a pocket 3$^a$ in which the blades 6$^a$ upon the propeller shaft 5$^a$ operate. The forward end of the propeller shaft extends through a cap 4′ at the forward end of the conduit which is provided with a stuffing box, and the propeller shaft is equipped with a wheel 8ª to which the operating device for the propeller may be applied.

In Fig. IV, I have shown another modification, in which 1ᵇ designates the vessel hull, and 4ᵇ a conduit extending longitudinally therethrough from the bow to the stern of the vessel. In this modification, the propeller shaft 5ᵇ is located within the conduit and intermediate of its ends, and has propeller blades 6ᵇ, the shaft being journaled in bearing members 7ᵇ. The propeller shaft has fixed to it a beveled pinion 8ᵇ that is engaged by a bevel wheel 12ᵇ carried by a suitable shaft extending vertically in the vessel hull, and adapted to be operated by power applied thereto in any convenient manner.

I claim:

1. In a marine vessel, the combination with a hull provided with a conduit extending longitudinally therethrough and discharging at the stern of the hull, said hull being provided with an enlarged water space opening through the bottom of the hull, the inlet opening into said water space being greater than the cross sectional area of said conduit, and a propeller co-axially mounted with said conduit and receiving its supply of water from said water space.

2. In a marine vessel, the combination with a hull provided with a conduit extending longitudinally therethrough and discharging at the stern of the hull, said hull being provided with an enlarged water space opening through the bottom of the hull, and a propeller within said conduit and coaxial therewith, said propeller being entirely to the rear of said enlarged water space and having a shaft extending through said water space and into the interior of said hull.

HENRI R. HENDERSON.

In the presence of—
  H. G. Cook,
  E. B. Linn.

---

Copies of this patent may be obtained for five cents each, by addressing the "Commissioner of Patents, Washington, D. C."